United States Patent [19]

Newell

[11] 4,128,352

[45] Dec. 5, 1978

[54] TWO AXIS FLEXURE

[75] Inventor: William H. Newell, Mount Vernon, N.Y.

[73] Assignee: The Perkin-Elmer Corporation, Norwalk, Conn.

[21] Appl. No.: 859,715

[22] Filed: Dec. 12, 1977

[51] Int. Cl.² .............................................. F16D 3/00
[52] U.S. Cl. ...................................... 403/57; 403/220; 64/11 R
[58] Field of Search ........................... 403/57, 74, 220; 64/11 R

[56] References Cited

U.S. PATENT DOCUMENTS

| | | | |
|---|---|---|---|
| 2,860,495 | 11/1958 | Stark | 64/11 R |
| 3,224,224 | 12/1965 | Kudriavetz | 64/11 R |
| 3,322,255 | 7/1967 | Seagreaves et al. | 64/11 R |
| 3,381,986 | 5/1968 | Seelig | 403/220 |
| 3,405,539 | 10/1968 | Tanaka | 64/11 R |
| 3,823,577 | 7/1974 | Smith | 64/11 R |
| 3,879,024 | 4/1975 | Scott et al. | 403/220 X |

Primary Examiner—Wayne L. Shedd
Attorney, Agent, or Firm—Salvatore A. Giarratana; Francis L. Masselle; Edwin T. Grimes

[57] ABSTRACT

A flexure, useful as a universal joint between two corotating members, the flexure being capable of flexing about two orthogonal axes, but providing extremely good stiffness with respect to translational forces is accomplished in a flexure in the form of a cross including two members having a cross-shaped cross-section extending along two mutually perpendicular axes, the members terminating at each end in solid pieces with the solid pieces at the end of the one member used for attachment to one of the rotating members and the solid pieces at the ends of the other member for attachment to the second rotating member.

8 Claims, 1 Drawing Figure

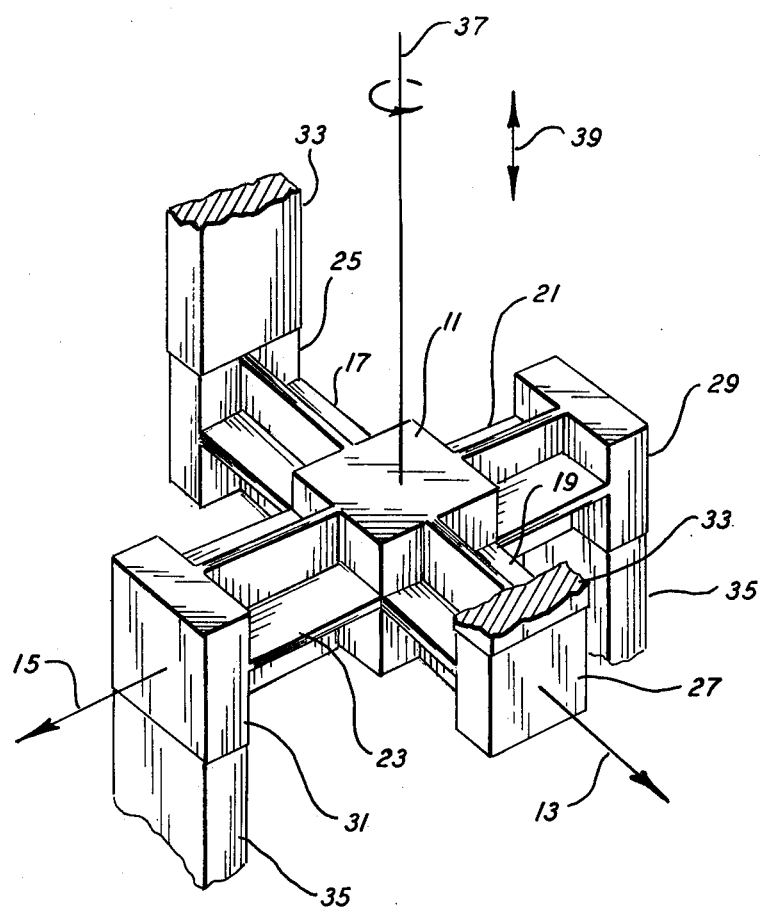

TWO AXIS FLEXURE

BACKGROUND OF THE INVENTION

This invention relates to flexure joints in general and more particularly to an improved flexure which provides a universal joint operable over small angles with no lost motion and which is very stiff against translational forces.

Various types of flexure joints have been developed to permit small amounts of rotational motion between two co-rotating structures. Many of these flexures have consisted of more than one piece and thus resulted in a certain amount of lost motion. Other flexures of this nature, although of a one piece construction, are difficult to make and do not always exhibit the required degree of stiffness with respect to translational forces.

SUMMARY OF THE INVENTION

The present invention provides a flexure, useful as a universal joint between two co-rotating members, the flexure being capable of flexing about two orthogonal axis, but providing extremely good stiffness with respect to translational forces. This is accomplished in a flexure in the form of a cross including two cross-shaped members extending along two mutually perpendicular axes, the cross-shaped members terminating at each end in solid pieces. The solid pieces at the end of the one member are used for attachment to one of the rotating members and the solid pieces at the ends of the other member for attachment to the second rotating member.

BRIEF DESCRIPTION OF THE DRAWING

The single FIGURE is a perspective view of the flexure of the present invention.

DETAILED DESCRIPTION OF THE INVENTION

As shown by the single figure, the flexure of the present invention is a one piece construction and includes a central block portion 11 of an essentially cubicle shape. Extending from the central block 11 along two mutually perpendicular axes 13 and 15 are the cruciform flexure members 17, 19, 21 and 23 of the present invention. These are all of identical construction and are simply cross-shaped members. As illustrated, the cruciform flexure structures 17, 19, 21 and 23 terminate respectively in solid rectangular blocks 25, 27, 29 and 31. These blocks provide pads by means of which rotating members which are to be coupled, through the universal joint which is formed by the flexure of the present invention, may be attached. Thus, one rotating member 33 shown in cut-away view may be attached to the blocks 25 and 27. The other rotating member 35 which is to co-rotate therewith is then attached to the blocks 29 and 31. Assume, for example, that the member 33 is the driving member and the member 35 is a driven member. As the member 33 rotates, that rotation will be transmitted through the flexure to the driven member 35. Because of the cruciform structure of the flexures 17, 19, 21 and 23, a good transmission of the driving force will take place since the structure is extremely stiff with respect to rotations about the central axis 37. Similarly, with respect to any translational forces in the direction of arrow 39 or the axes 13 and 15, the structure is stiff. However, rotations through small angles about the axes 13 or 15, as are required in a universal joint to take up small misalignments between the two members 33 and 35, are possible without difficulty. About these axes, the flexure will flex because of the cruciform structure.

As can be seen from the figure, the whole assembly can be made of a single piece simply by making appropriate cuts in a rectangular block. The preferred materials for the flexure of the present invention are steel or aluminum although other materials which have some resiliency, such as plastic, may be used. Material selected for use in the flexure is selected by considering the flexibility and strength desired in the flexure.

Various modifications may be made in the illustrated structure. For example, the central block 11 is not a necessity; the flexure portions 17, 19, 21 and 23 could be extended to the center of the structure and still provide good stiffness about the axis 37 and in the direction of arrow 39 or along the axes 13 and 15. However, since such is not necessary for flexure about the axes 13 and 15, the central solid area is preferred. In addition, modifications can be made in the structure at the outer ends of the flexures, i.e., the structures 29 and 31, 27 and 25, in order to facilitate attachment of members to the flexure assembly.

What is claimed is:

1. An improved flexure assembly comprising:
   (a) a first member having a cross-shaped cross-section extending along a first axis;
   (b) a second member having a cross-shaped cross-section extending along a second axis perpendicular to said first axis intersecting said first member and rigidly coupled thereto; and
   (c) means on the two ends of each of said first and second members for attachment, whereby two operatively connected members between which there must be provisions for universal joint action can be coupled respectively to the means at the ends of said first member and the means at the ends of said second member, said flexure thereby providing for a stiffness to permit transmission of forces between said two members both along a third axis mutually perpendicular to said first and second axes and in a direction along said first, and second axes while permitting bending through small angles about said first and second axis.

2. Apparatus according to claim 1 wherein said first and second members and the means on the ends thereof are formed of a single piece of material.

3. Apparatus according to claim 2 wherein the means on the ends of said members comprise rectangular blocks.

4. Apparatus according to claim 1 wherein said first and second members intersect in a solid area forming a central member thereby providing a first section of said first member extending in one direction along said first axis from said central member and a second section extending along said first axis in the opposite direction from said first secion of said first member and said second member having a first section extending in one direction along said second axis from said central member and a second section extending in the opposite direction along said second axis from said first section of said second member.

5. Apparatus according to claim 4 wherein said flexure is made of a single piece of material.

6. Apparatus according to claim 5 wherein said flexure is made of one of the members of a class of materials including steel, aluminum, and plastics.

7. Apparatus accrding to claim 1 wherein said flexure is made of one of a class of materials including steel, aluminum, and plastics.

8. An improved one piece flexure having:
- a first member having a cross-shaped cross-section extending along a first axis;
- a second member having a cross-shaped cross-section extending along a second axis perpendicular to the first axis, said second member joined to the first member; and
- means on the two ends of each of said first and second members for attachment, whereby two operatively connected members between which there must be provisions for universal joint action can be coupled respectively to means at the ends of said first member and the means at the ends of said second member, said flexure thereby providing for a stiffness to permit transmission of forces between said two members along a third axis mutually perpendicular to said first and second axes and in a direction along said first and second axes while permitting bending through small angles about said first and second axis.

* * * * *

UNITED STATES PATENT AND TRADEMARK OFFICE
CERTIFICATE OF CORRECTION

PATENT NO. : 4,128,352
DATED : December 5, 1978
INVENTOR(S) : William H. Newell

It is certified that error appears in the above-identified patent and that said Letters Patent are hereby corrected as shown below:

Column 2, line 58, change "secion" to --section--.

Column 3, line 1, change "accrding" to --according--.

Signed and Sealed this

Fourth Day of September 1979

[SEAL]

Attest:

LUTRELLE F. PARKER
Attesting Officer   Acting Commissioner of Patents and Trademarks